Dec. 9, 1924.

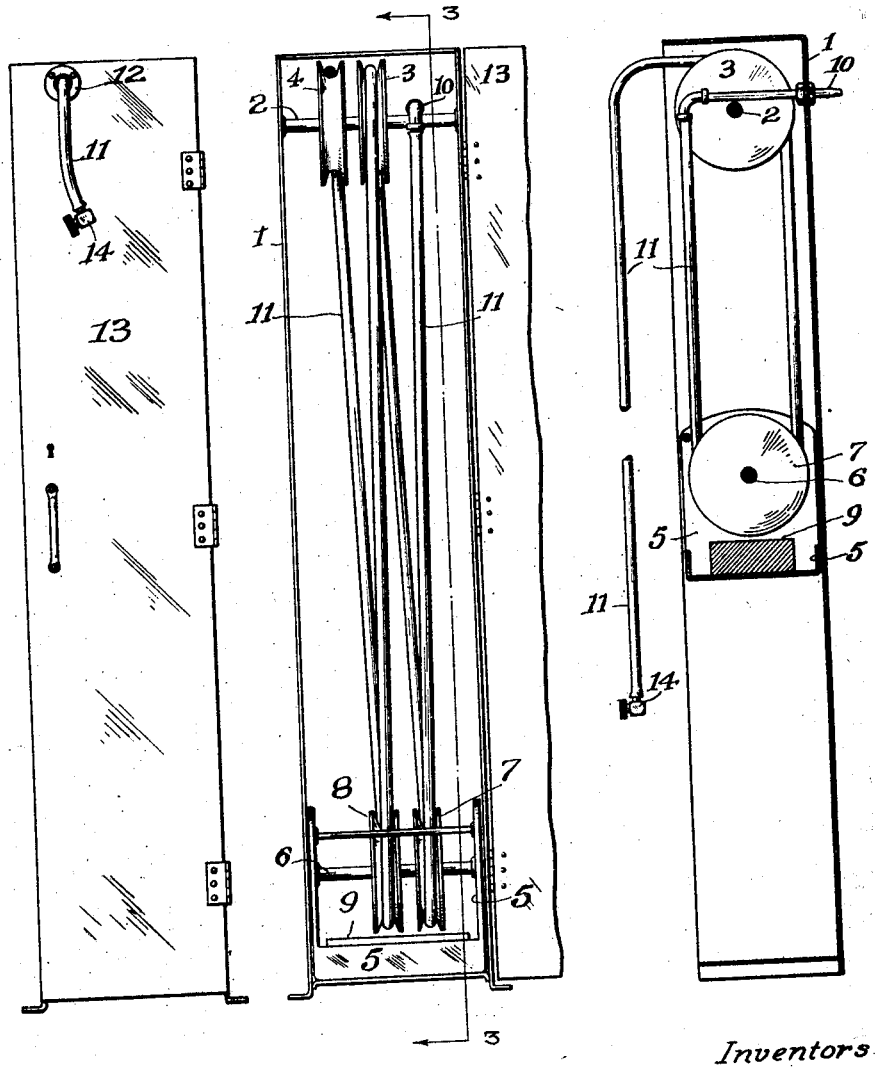

A. C. WALKER ET AL 1,518,881

AIR HOSE EQUIPMENT

Filed June 25, 1923

2 Sheets-Sheet 2

Inventors
Ario C. Walker
William R. Young
by

Attorney

Patented Dec. 9, 1924.

1,518,881

UNITED STATES PATENT OFFICE.

ARIO C. WALKER, OF BRIDGEPORT, AND WILLIAM R. YOUNG, OF FAIRFIELD, CONNECTICUT.

AIR-HOSE EQUIPMENT.

Application filed June 25, 1923. Serial No. 647,568.

*To all whom it may concern:*

Be it known that we, ARIO C. WALKER and WILLIAM R. YOUNG, both citizens of the United States, residing, respectively, at Bridgeport, Fairfield County, Connecticut, and Fairfield, Fairfield County, Connecticut, have invented certain new and useful Improvements in Air-Hose Equipment; and we do declare the following to be a full, clear, and exact description of the invention, such as will enable others skilled in the art to which it appertains to make and use the same.

This invention relates to an air hose equipment, such as is commonly used in garages and automobile supply stores, for the purpose of furnishing compressed air for the inflation of the inner tubes of automobile tires.

Heretofore, it has been customary to coil the air hose or to throw the same in a tangled mass on the sidewalk or on the floor of the garage, the consequence being that the hose became covered with all kinds of filth and dirt, thus rendering the handling of it very unpleasant.

The object of the present invention is to supply a hose equipment of this sort which shall always be normally housed within a suitable receptacle and which is readily withdrawn therefrom when it is desired to use the hose.

Further objects will appear from the description herein, taken in connection with the accompanying drawing in which—

Figure 1 is a front elevation showing the invention with the door closed—

Figure 2 a front view with the door open—

Figure 3 a section at the line 3—3 of Figure 2 showing the position of the parts when the air hose is partially withdrawn—

Figure 4:
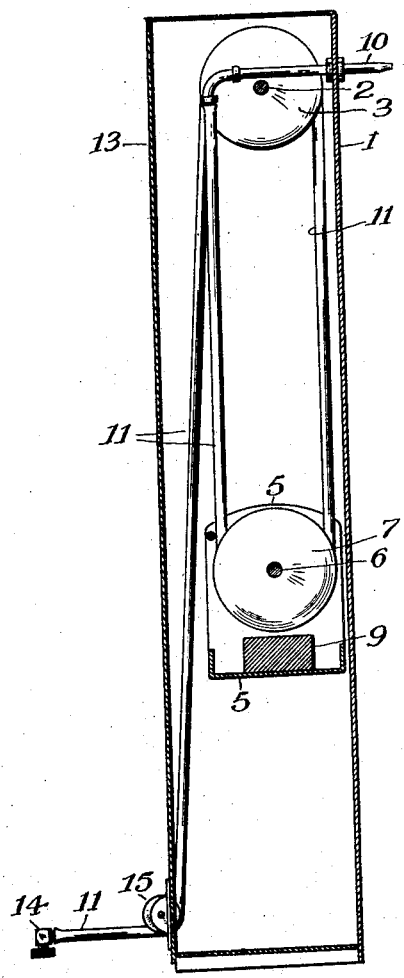
Figure 5:
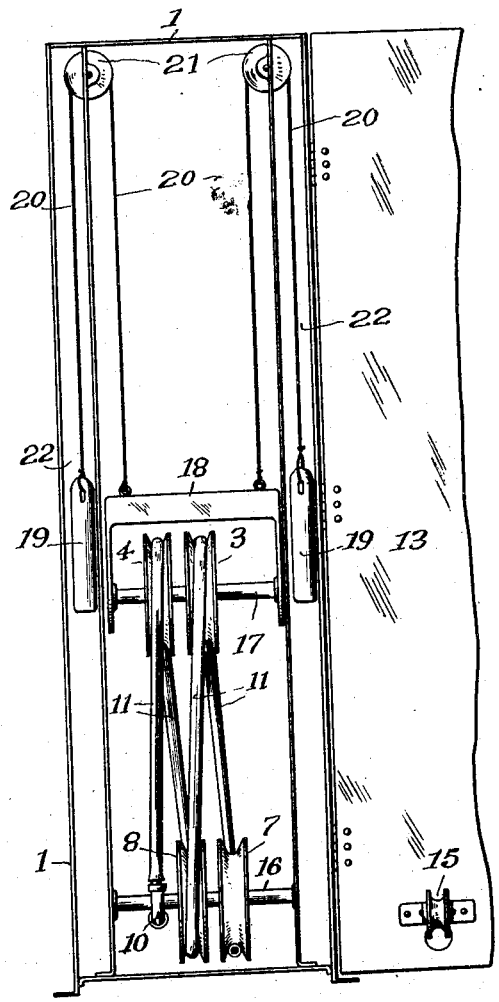

Figure 4 a section similar to Figure 3 but showing the door closed and the air hose in position to be withdrawn from the bottom of the structure, and Figure 5 is a front view of the invention with the door open, and showing a modified form of the invention.

Similar numerals of reference denote like parts in the several figures of the drawing.

1 is any suitable casing or frame having secured to its top portion a shaft 2 on which are mounted loose pulleys 3, 4.

5 is any suitable tray or box-like structure fitting snugly within the casing 1 but capable of free vertical movements, and 6 is a shaft secured to the sides of this structure and having loosely mounted thereon pulleys 7, 8.

This box 5 contains a weight 9, so that the weighted box may act as an overpoise for the purpose of always returning this box and the parts carried thereby to normal position as shown at Figure 2.

10 is the air pipe which leads from any suitable compressed air supply, and to this pipe is secured one end of the air hose 11, the air pipe being extended through the casing 1 so as to be conveniently located. This air hose 11 is then brought down around the bottom pulley 7, up over the top pulley 3, then down around the bottom pulley 8 and finally up around the top pulley 4, the free end of the hose being then extended through any suitable metal bushing 12 secured to the top of the door 13 and equipped with the usual air delivery nozzle 14.

In utilizing the device the hose is merely grasped and pulled, thereby causing the overpoise to become elevated as shown at Figure 3, and when there is no further use for the hose it is released and will be returned to its normal position by the action of the overpoise which will return the parts to the position shown at Figure 2.

It is frequently advantageous that the hose be drawn from the bottom of the structure, and therefore at Figure 4, the hose is shown brought downwardly and beneath an idle pulley 15 secured to the bottom of the door 13.

Instead of providing for an overpoise, as shown at Figures 2, 3, and 4, a construction is shown at Figure 5 in which a bottom shaft 16 is secured to the casing while an upper shaft 17 is secured to a frame 18 capable of free vertical movements within the casing and this frame 18 is connected to overpoise weights 19 by means of cords 20 which are passed over idle pulleys 21 secured at the top of the casing, these overpoise weights 19 operating within pockets 22 formed at the sides of the casing.

In this construction shown at Figure 5 the air pipe 10 extends through the bottom of the casing and the air hose is led around the pulleys in a manner similar to that heretofore described the extreme end of the hose passing around one of the bottom pulleys beneath the idle pulley 15 through the door of the casing.

It will thus be readily understood that it is immaterial whether the upper or lower set of pulleys is connected to the movable element.

The box-like structure 5 may of itself be heavy enough to obviate the use of any weight, but the latter is preferred.

The pulleys are all capable of both rotary and sliding movements on their shafts, so that they may adjust themselves to the line of draft of the hose through the opening in the door, and this is particularly advantageous in the event that additional pulleys are placed on the shafts in order to provide for a longer air hose.

The nozzle also acts as a stop to prevent the hose from being drawn through the door into the casing.

Having thus described our invention what we claim as new and desire to secure by Letters Patent is:—

In air hose equipment, a casing, a hinged door for the casing having an opening, a shaft journaled in the casing at points adjacent to said opening of the door, a plurality of pulleys each loosely journaled on the said shaft and capable of independent rotary and sliding movements thereon, a vertically slidable member in the casing, a shaft carried by said member, a plurality of pulleys each loosely journaled on said last named shaft and capable of independent rotary and sliding movements thereon, an air supply pipe fixed to the casing and having a part thereof disposed adjacent and opposite to the outer side face of the adjacent pulley of the first named shaft, and an air hose having one end secured to said pipe and being engaged alternately around the pulleys of the several shafts, said opening of the door being formed to substantially aline with the other pulley of the first named shaft.

In testimony whereof we affix our signatures hereto.

ARIO C. WALKER.
WILLIAM R. YOUNG.